(12) United States Patent
Wass et al.

(10) Patent No.: US 7,171,977 B2
(45) Date of Patent: Feb. 6, 2007

(54) COMBINATION PRESSURE RELIEF AND TOPPING VALVE

(76) Inventors: Lloyd Wass, 1670 Blackhawk Cove, Eagan, MN (US) 55122; Bob Venne, 509 First St. SW., Crosby, MN (US) 56441

( * ) Notice: Subject to any disclaimer, the term of this patent is extended or adjusted under 35 U.S.C. 154(b) by 63 days.

(21) Appl. No.: 10/081,531

(22) Filed: Feb. 22, 2002

(65) Prior Publication Data

US 2003/0159731 A1    Aug. 28, 2003

(51) Int. Cl.
*F16K 15/10* (2006.01)
*F16K 17/26* (2006.01)

(52) U.S. Cl. ............... 137/226; 137/493.4; 137/493.9

(58) Field of Classification Search .............. 137/224, 137/226, 493.3, 493.4, 493.9
See application file for complete search history.

(56) References Cited

U.S. PATENT DOCUMENTS

| | | | | |
|---|---|---|---|---|
| 1,369,343 A | * | 2/1921 | Lamb | 137/226 |
| 1,837,970 A | * | 12/1931 | Jones | 137/226 |
| 1,841,354 A | * | 1/1932 | Bowen | 137/493.4 |
| 2,254,655 A | * | 9/1941 | Everet | 137/226 |
| 2,349,416 A | * | 5/1944 | Freeman | 137/493.4 |
| 2,606,570 A | * | 8/1952 | Buenik | 137/226 |
| 2,690,757 A | * | 10/1954 | Orchowski | 137/226 |
| 3,108,610 A | * | 10/1963 | De See | 137/493.4 |
| 3,450,147 A | * | 6/1969 | Webb | 137/226 |
| 3,971,406 A | * | 7/1976 | Inada et al. | 137/493.4 |
| 4,691,734 A | * | 9/1987 | Fort | 137/493.4 |
| 5,029,604 A | * | 7/1991 | Spektor et al. | 137/226 |
| 5,282,492 A | * | 2/1994 | Angeli | 137/493.4 |

* cited by examiner

*Primary Examiner*—John Rivell
(74) *Attorney, Agent, or Firm*—Gray, Plant, Mooty, Mooty & Bennett, PA; Peter Forrest

(57) ABSTRACT

A combination or hybrid pressure relief and topping valve for use with inflatable devices such as life rafts and escape slides. The valve including a valve body with a fluid passage therein that includes an internal shoulder. The valve further includes a first poppet with a seal seated therein where the first poppet is biased against the shoulder by a first spring. The first poppet and seal further having an aperture therein. The valve also includes a second poppet biased into the aperture by a second spring. The combination of poppets, springs and the seal provide for a neutral mode where the valve is sealed, a topping mode where fluid is allowed to pass through the valve and into an inflatable device sealed to one end of the valve, and a pressure relief mode where fluid is released from the inflatable device to the atmosphere when overpressure within the inflatable device exists.

7 Claims, 14 Drawing Sheets

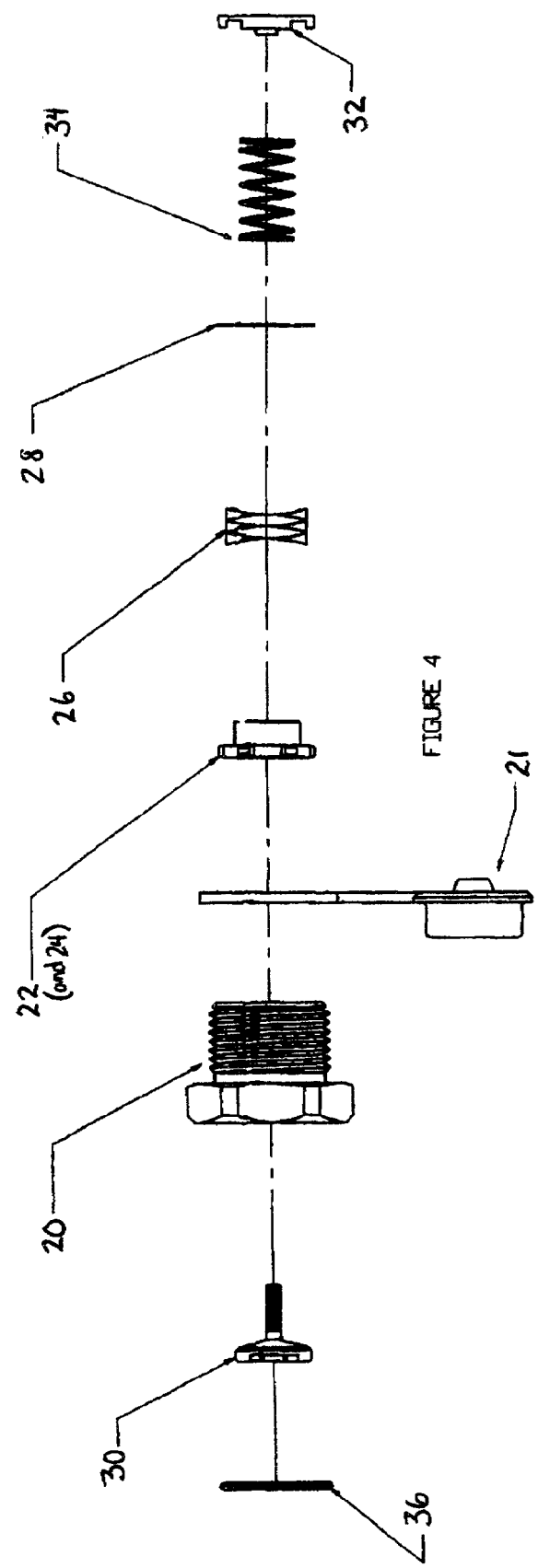

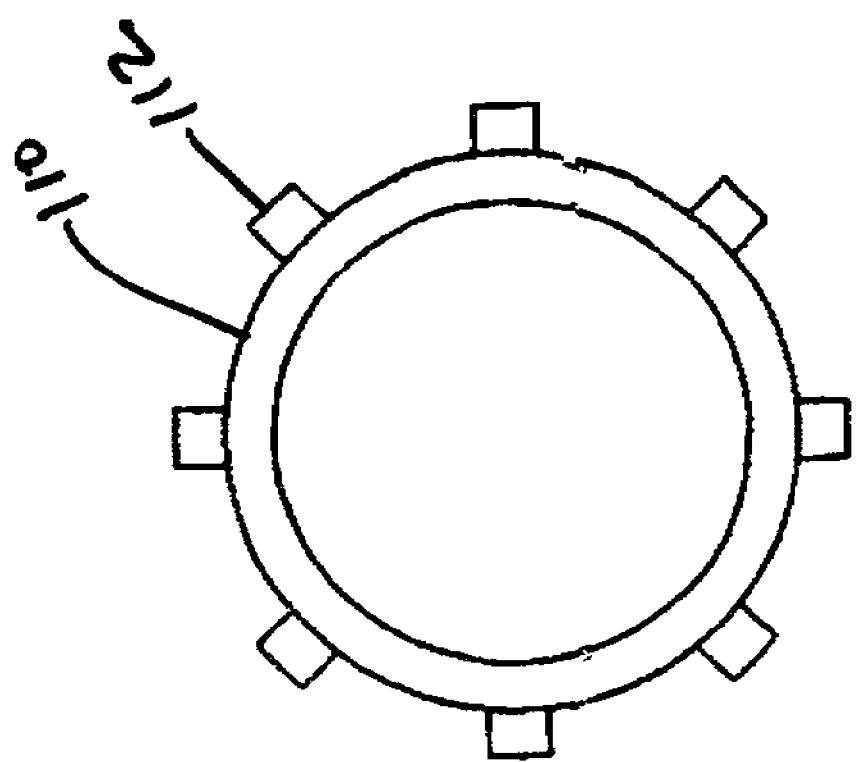

COMBINATION PRESSURE RELIEF AND TOPPING VALVE

BACKGROUND OF THE INVENTION

1. Technical Field

The invention relates to a valve designed for multiple uses including pressure relief only, topping only, and a combination of pressure relief and topping as needed. More particularly, the invention relates to a combination or hybrid valve for pressure relief and topping applications for use with inflatable devices.

2. Background Information

In recent years, the use of and demand for inflatable devices has grown significantly. Inflatable devices are now commonly used by the military, shipping and airline industries in such specific applications as life rafts, escape slides and rigid-hull inflatable boats often referred to as RIBS.

These inflatable device manufacturers generally utilize a compressed gas charge to inflate the inflatable devices. Specifically, compressed gas is stored in an appropriate pressure tank or cylinder, and it is full, often referred to as pressurized, of carbon dioxide, dry air, nitrogen or a combination of these or similar gases. The volume of gases stored in the cylinder is dependent on the volume of gas required to inflate the inflatable device to the optimum pressure.

To insure proper inflation in cold climate conditions, inflatable device manufacturers must store a larger volume of compressed gas than is required to inflate the device in warm climate conditions. This extra volume/pressure must be released from the inflatable device during warm climate inflation because the inflatable device may be damaged if not relieved.

It is highly recommended and often required that at least one pressure relief valve (PRV) be installed on these inflatable devices to provide for this over-pressure exhausting. This PRV releases the excess volume/pressure. Over-inflation, which may damage or burst the inflation device thereby subjecting the surrounding environment and persons to possible damage and injury, is prevented by this over-pressure exhausting. This release of the fluid contents returns the inflation device to a safe working pressure.

Under different circumstances, the inflatable device will need additional compressed gas to increase the volume/pressure in the inflatable device to the desired levels. This may be due to any of a variety of reasons such as compressed gas level provided being insufficient based upon colder climate than expected, leak in the inflatable device, etc. The additional compressed gas is often provided via a topping valve (sometimes referred to as inflate/deflate valve). This valve is installed in inflatable devices to facilitate the connection of an air pumping mechanism or other compressed gas providing device.

SUMMARY OF THE INVENTION

It is desirable to create a valve which combines a topping valve and a pressure relief valve into one valve body.

These objectives and advantages are obtained by the improved valve of the present invention, the general nature of which may be stated as a valve including a valve body with a fluid passage therein that includes an internal shoulder. The seal further includes a first poppet with a seal seated therein where the first poppet is biased against the shoulder by a first spring. The first poppet and seal further having an aperture therein. The valve also includes a second poppet biased into the aperture by a second spring. The combination of poppets, springs and the seal provide for a neutral mode where the valve is sealed, a topping mode where fluid is allowed to pass through the valve and into an inflatable device sealed to one end of the valve, and a pressure relief mode where fluid is released from the inflatable device to the atmosphere when overpressure within the inflatable device exists.

BRIEF DESCRIPTION OF THE DRAWINGS

The preferred embodiment of the invention, illustrative of the best mode in which applicant has contemplated applying the principles, is set forth in the following description and is shown in the drawings and is particularly and distinctly pointed out and set forth in the appended claims.

FIG. 4 is an exploded view of the hybrid pressure relief and topping of FIGS. 1 and 2;

FIG. 19 is an end view of the self locking spring retainer of the hybrid pressure relief and topping of FIGS. 1 and 2;

Similar numerals refer to similar parts throughout the drawings.

DESCRIPTION OF THE PREFERRED EMBODIMENT

Figure 2:
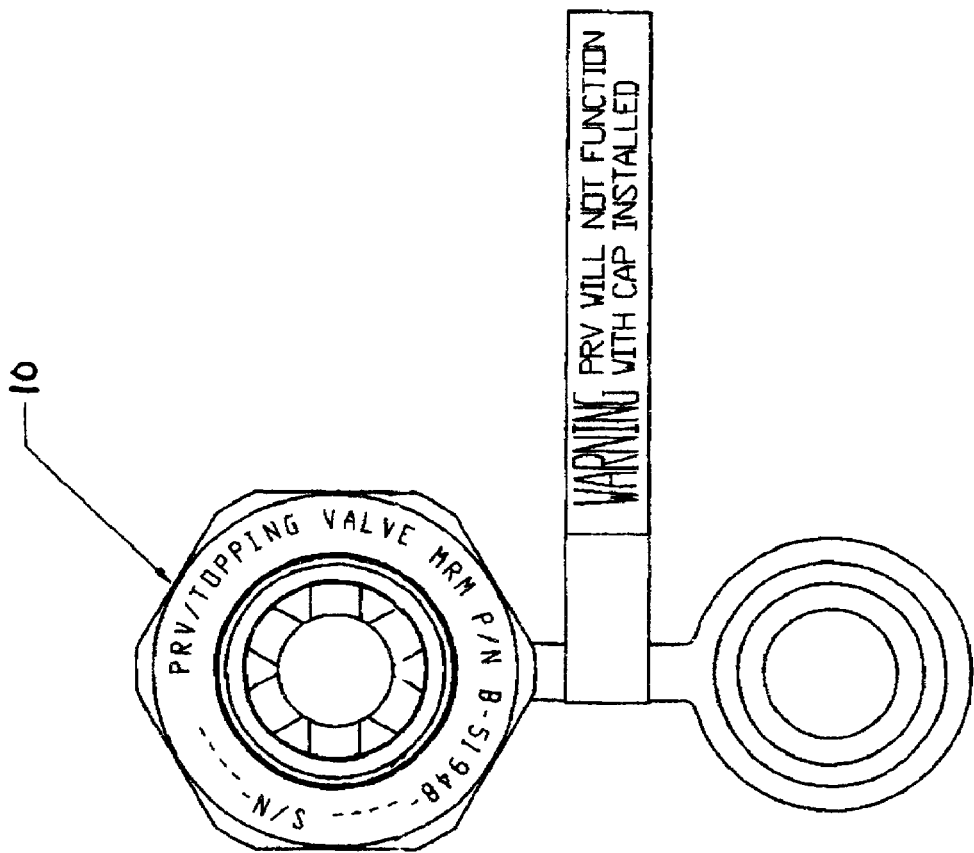
FIG. 2 is a top view of the hybrid pressure relief and topping valve of FIG. 1.
Figure 1:
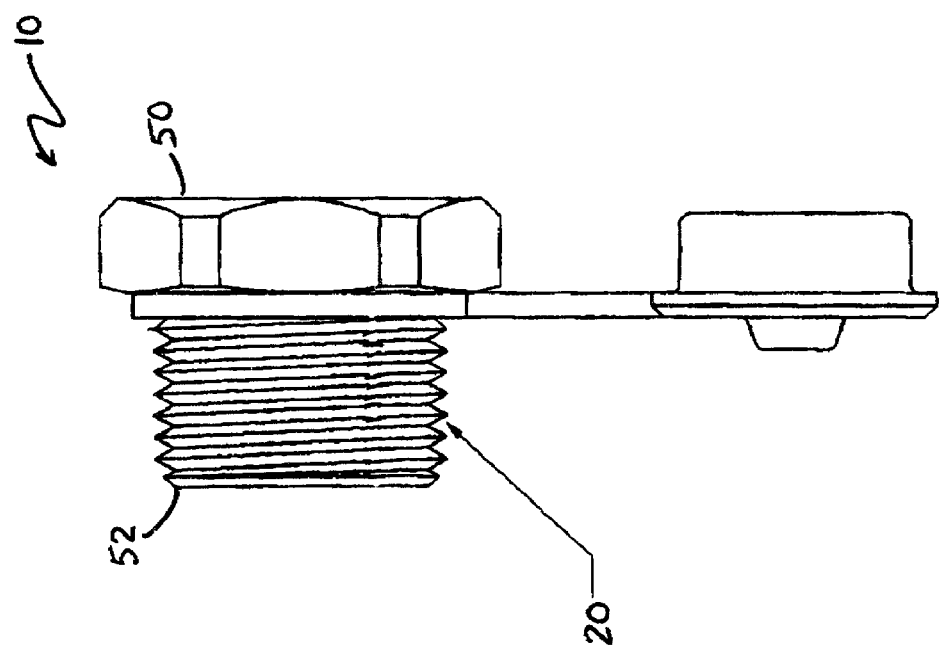
FIG. 1 is a side view of the hybrid pressure relief and topping valve of the present invention.
Figure 3:
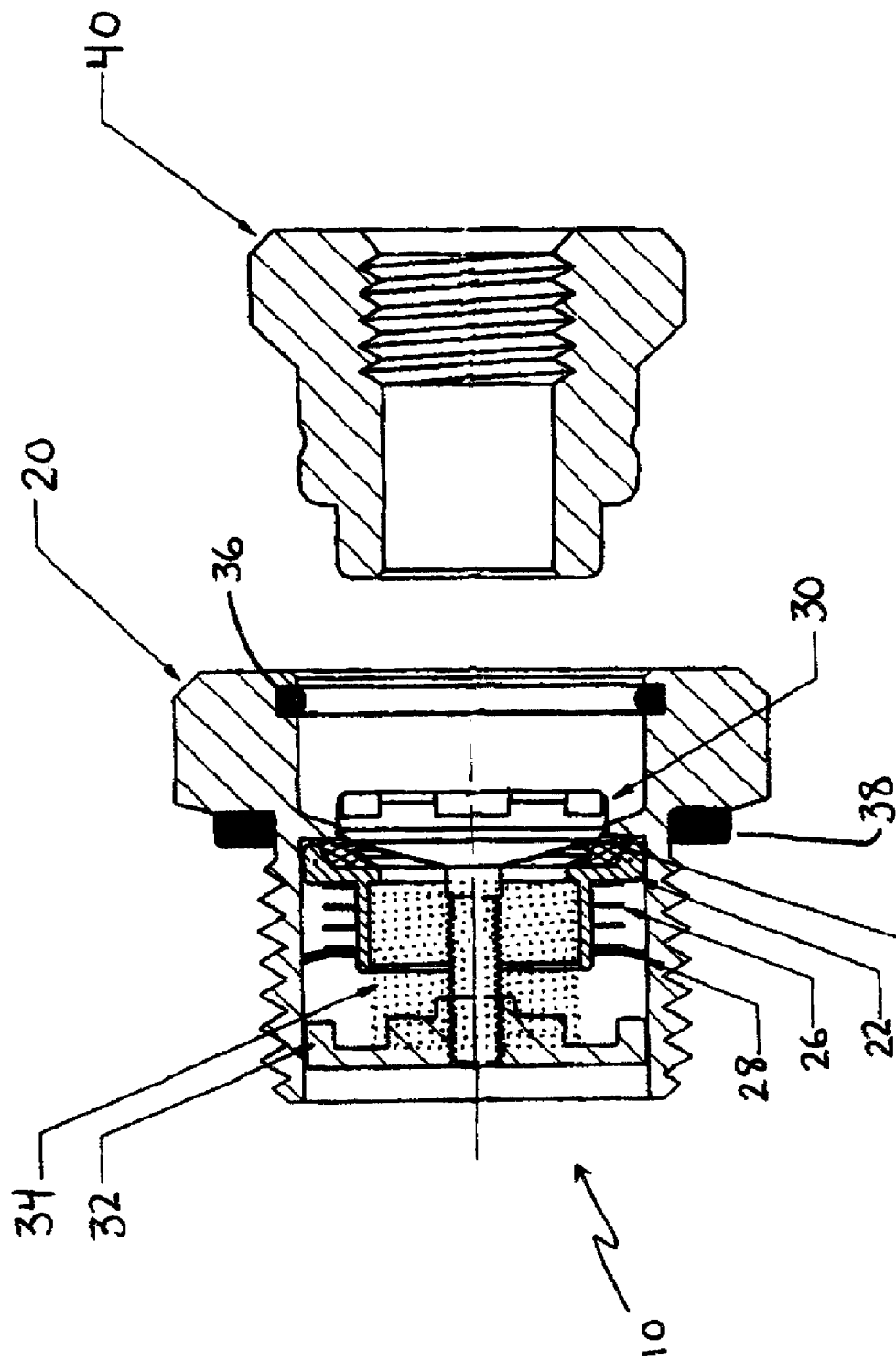
FIG. 3 is a partially exploded sectional view of the hybrid pressure relief and topping of FIGS. 1 and 2 where the valve is shown in a neutral position.

The present invention is a combination or hybrid pressure relief and topping valve is indicated generally at 10 and generally shown in FIGS. 1–2, and is best shown in detail in FIGS. 3–4, and is for use in inflatable devices such as life rafts and escape slides. Valve 10 may be used with any type of inflatable device where it is necessary or desirable to provide for one or both the exhaustion of excess or surplus pressure when the inflation device is inflated beyond a predetermined maximum pressure limit, and/or topping or additional inflation when the inflation device is underinflated or inflated below a predetermined desirable pressure.

The present invention is a hybrid topping and pressure relief valve 10 as shown exploded in FIG. 4 and includes a valve body 20, a topping valve poppet 22, a seal 24, a topping valve spring 26, a topping valve spring retainer 28, a pressure relief poppet 30, a pressure relief spring retainer and guide 32, a pressure relief spring 34, an o-ring 36, and a gasket 38. In addition, in some embodiments a pump adapter 40 may be provided and/or a cap 21.

Figure 10:
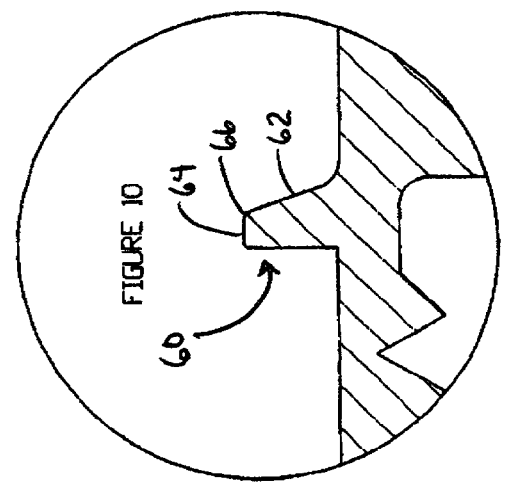
FIG. 10 is an enlarged view of a portion of the valve body of FIG. 9.
Figure 8:
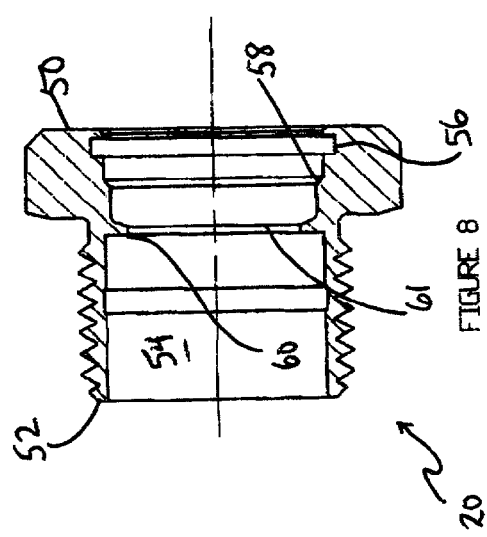
FIG. 8 is sectional view of the valve body of the hybrid pressure relief and topping of FIGS. 1 and 2.
Figure 12:
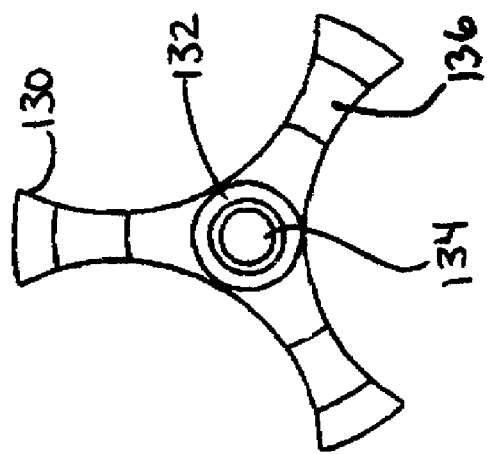
FIG. 12 is a top view of the spring retainer and guide of FIG. 11.
Figure 11:
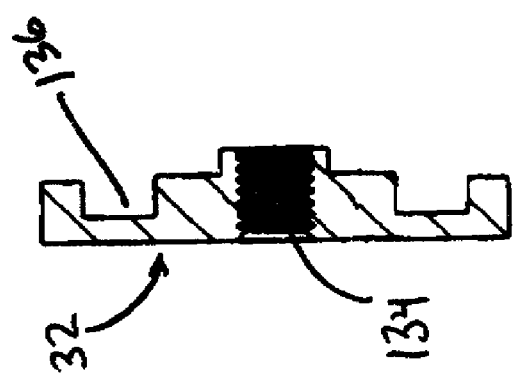
FIG. 11 is a sectional view of the spring retainer and guide of the hybrid pressure relief and topping of FIGS. 1 and 2.

Valve body 20 is best shown in FIGS. 1–4 and 8–10. Valve body 20 in the preferred embodiment shown includes first or outer end 50, which is generally configured as a hexagonal head, and a second or inner end 52, which is generally configured as a threaded neck. A fluid passage 54 extends from the first end 50 to the second end 52. Within the fluid passage 54 is an o-ring groove 56, a tapered shoulder 58 and an inwardly extending flange 60 that defines flow aperture 61. The flange including a tapered surface 62 as best shown in FIG. 10, transitioning to a hole surface 64 via a rounded transition 66.

Figure 7:
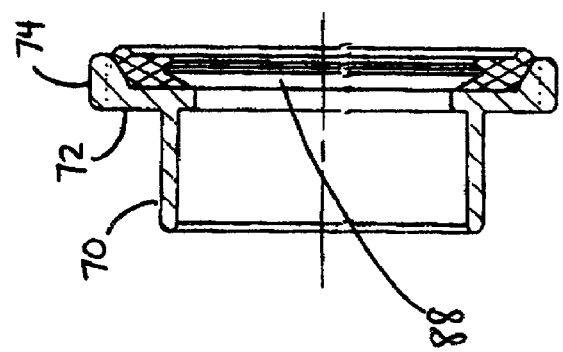
FIG. 7 is a sectional view of the seal seated and molded in the topping poppet of the hybrid pressure relief and topping of FIGS. 1 and 2.
Figure 6:
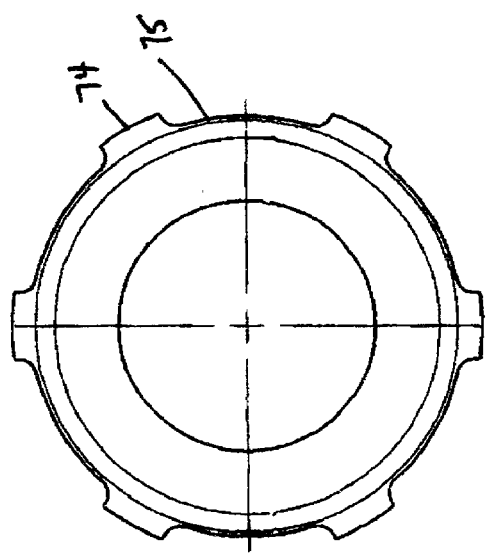
FIG. 6 is a top view of the topping poppet of FIG. 5.
Figure 5:
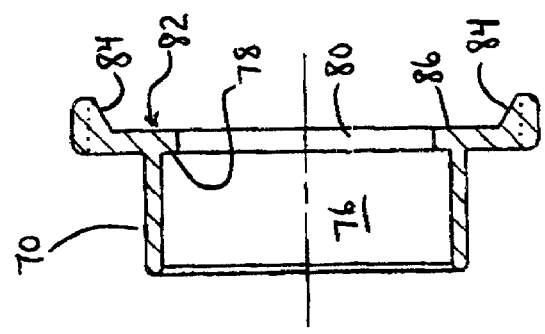
FIG. 5 is a sectional view of the topping poppet of the hybrid pressure relief and topping of FIGS. 1 and 2.

Topping valve poppet 22 and seal 24 are best shown in FIGS. 5–7 where seal 24 is bonded or molded to poppet 22 in the preferred embodiment although in other embodiments different seating and/or attachment techniques are contemplated. Topping valve poppet 22 includes a first cylindrical portion 70, a step or shoulder 72, and a second cylindrical portion that is of a stepped design all of which is of a larger diameter than the first cylindrical portion where the second cylindrical portion includes a plurality of outwardly extending nubs or stops 74 and fluid flow grooves 75 therebetween. The first cylindrical portion 70 includes a cylindrical aperture 76 therethrough that ends at a shoulder 78 surrounding a circular aperture 80 of a smaller diameter than aperture 76. The second generally cylindrical portion 74 includes a recessed seat 82 that is defined by a circumferential tapered wall 84 terminating at a base surface 86 surrounding circular aperture 80.

Seal 24 includes an aperture 88 and is best shown in FIG. 7 where it is shaped and design to snuggly seat during bonding or molding within recessed seat 82. Seal 24 includes a tapered outer surface 90 (that is placed against the poppet), a pressure relief poppet facing surface 92, an inner surface 94, and a topping poppet engaging surface 96 (that is placed against the poppet). The tapered outer surface tapers outward to a rounded outermost lip 98 positioned where the facing surface 92 meets the outer surface 90. The lip 98 is a circular lip facing out from the engaging surface 92 around its entire circumference and defining a recessed area radially inside of the lip on the seating surface 98.

The inner surface 94 includes a rounded inwardly extending sealing shoulder 100, a valley 102, and a tapered surface 104 extending to an edge 106 connecting inner surface 94 to seating surface 96. Sealing shoulder 100 circumferentially extends inward from inner surface 94 around aperture 88.

The topping valve spring 26 is a spring designed, shaped, sized and configured to seat over first cylindrical portion 70 and against shoulder 72. The topping valve spring retainer 28 is used to secure the spring 26 within the valve body 20. In one embodiment, the retainer 28 is adhered via interference fit, adhesive, ultrasonic welding or other attachment techniques within the fluid passage 54. In one embodiment as is shown FIG. 19, the retainer 28 includes a ring 110 with spokes 112 extending therefrom to provide additional air passage therearound.

Figure 14:
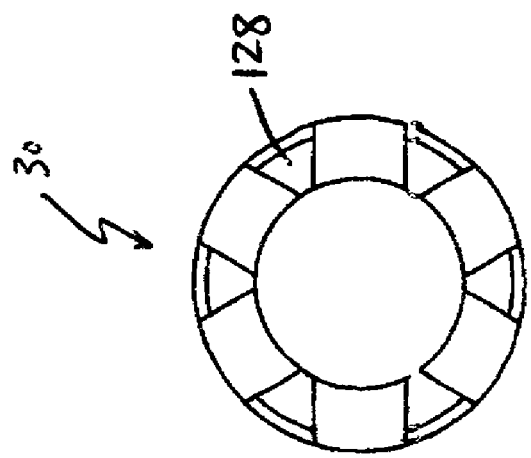
FIG. 14 is a top view of the pressure relief poppet of FIG. 13.
Figure 13:
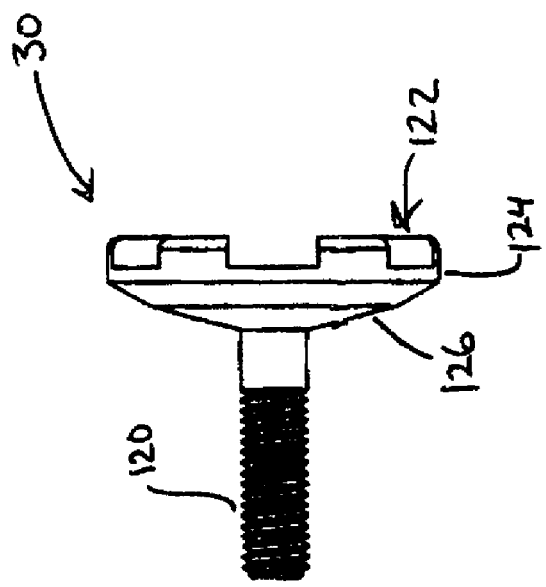
FIG. 13 is a view of the pressure relief poppet of the hybrid pressure relief and topping of FIGS. 1 and 2.
Figure 16:
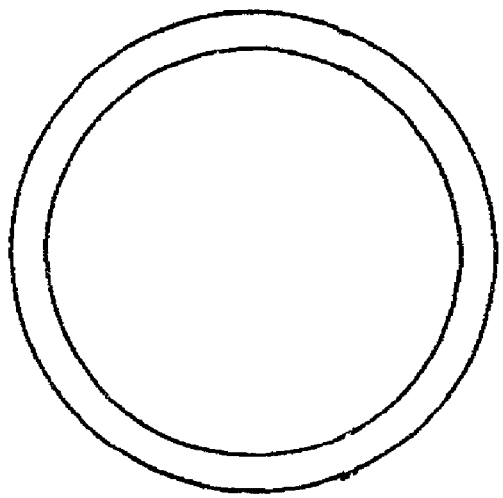
FIG. 16 is an end view of the wave spring of FIG. 15.
Figure 15:
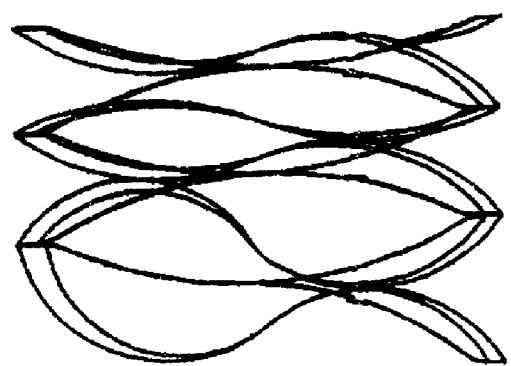
FIG. 15 is a view of the wave spring of the hybrid pressure relief and topping of FIGS. 1 and 2.
Figure 18:
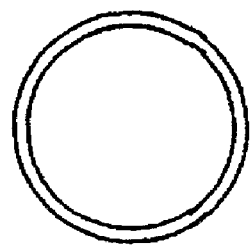
FIG. 18 is an end view of the poppet spring of FIG. 17
Figure 17:
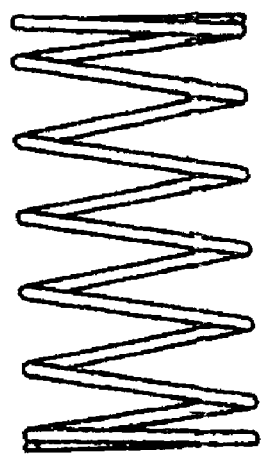
FIG. 17 is a view of the poppet spring of the hybrid pressure relief and topping of FIGS. 1 and 2.
Figure 20:
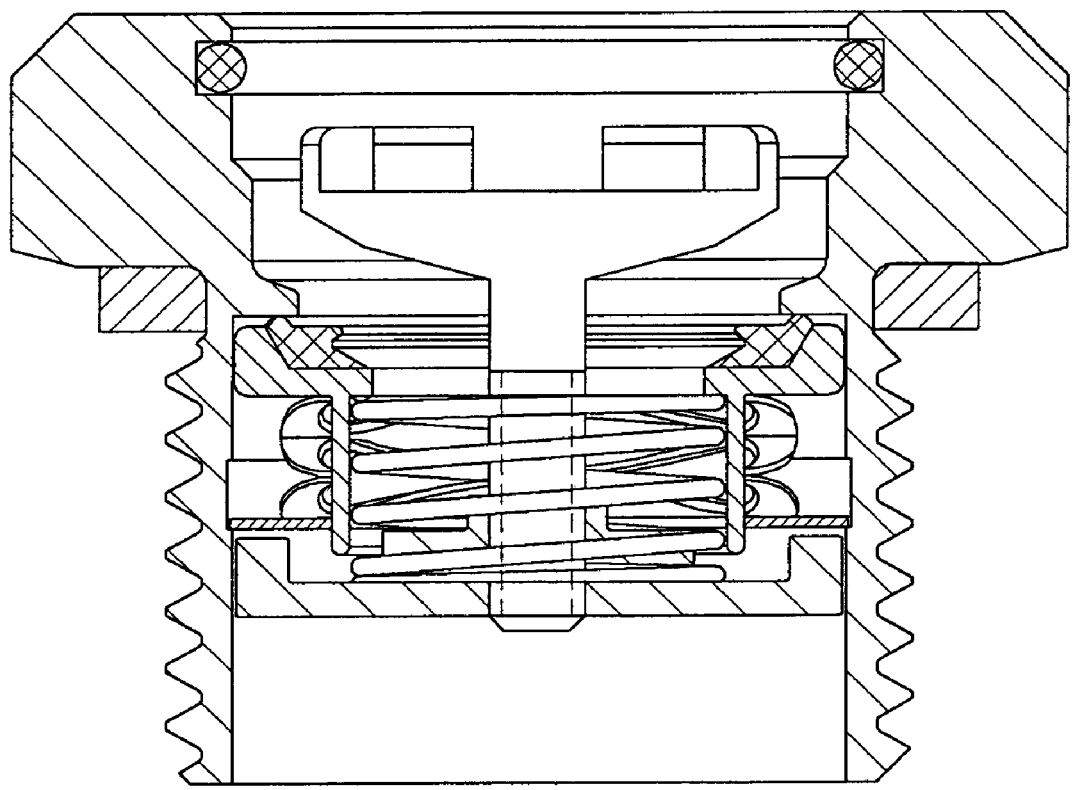
FIG. 20 is a partially exploded sectional view of the hybrid pressure relief and topping similar to that view of FIG. 3 except the valve is shown in a pressure relieving position.
Figure 21:
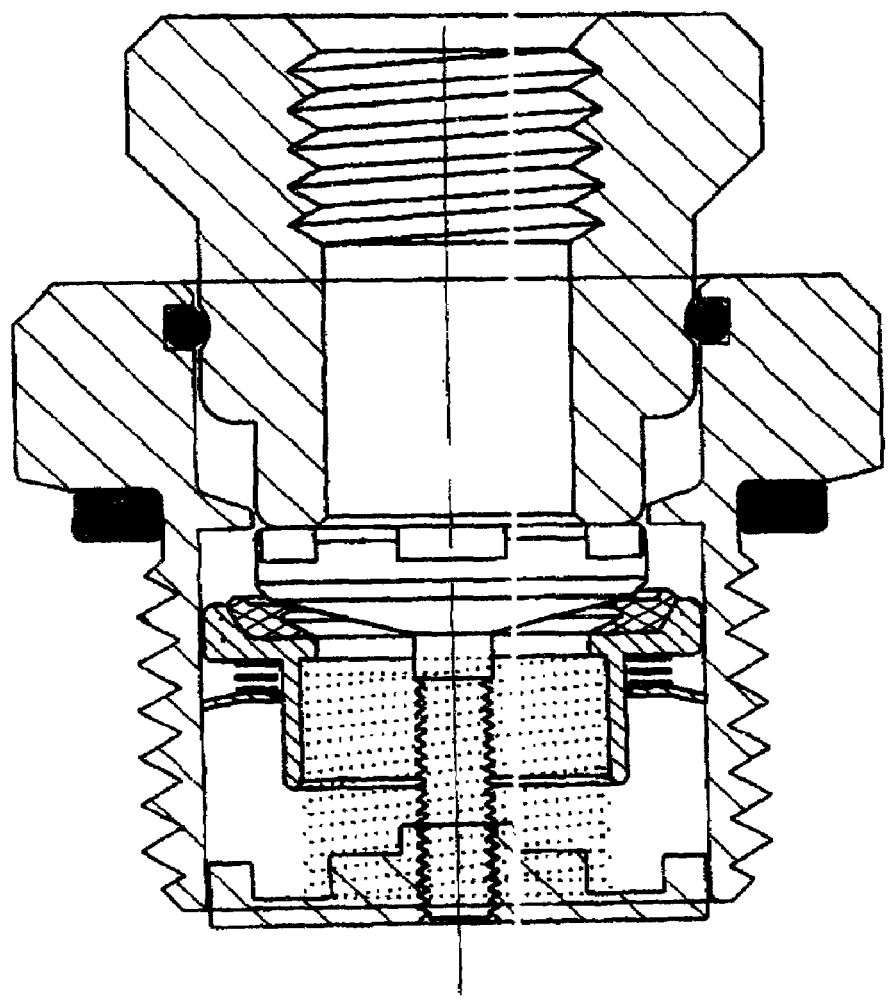
FIG. 21 is a partially exploded sectional view of the hybrid pressure relief and topping similar to that view of FIG. 3 except the valve is shown in an inflating or topping position.

The pressure relief poppet 30 as best shown in FIGS. 13–14 includes a threaded stem 120 connected to a head 122. The head 122 includes a main portion 124 with a tapered neck 126. The head 122 on its end surface includes a plurality of raised nodes 128 each of a trapezoidal end shape where the outermost surface is tapered or rounded.

The pressure relief spring retainer and guide 32 includes a plurality (in the embodiment shown three) branches 130 extending outward from a center hub 132 with a threaded hole 134 therein. Each branch 130 has a groove 136 therein. The retainer and guide 32 sandwiches spring 34 around threaded stem 120 of poppet 30, and within and against shoulder 78 in cylindrical aperture 76 of the first cylindrical portion 70 of poppet 22.

The valve as shown in FIG. 3 is in its neutral position or mode. The springs 26 and 34 are biasing poppet 22 with bonded seal 24 thereon against the shoulder 60 and poppet 30 against seal 24 thereby prohibiting any fluid flow.

Pump adapter 40 provides a quick connection for inflating, topping or filling. The adapter 40 fits within a portion of fluid passage 54 at the outer end 50. The frontmost end of pump adapter 40 engages with head 122 of poppet 30. The nose or end of the pump adapter (or alternatively or in addition the release of compressed gas of such a pressure to overcome the bias of spring 26) pushes the adapter 40 against head 122 which in turn pushes poppet 30 in and through aperture 61 by compressing spring 26 and thus forcing poppet 22 (with seal 24 and poppet 30) toward retainer 28. The result is movement of poppet 30, seal 24, poppet 22, spring 34 and retainer 32 axially inward while compressing spring 26 against or toward retainer 28. Other devices or procedures may be used to move poppet 30 as described above through aperture 61 to open the valve for inflation, topping or the like. As described in this paragraph, this is a topping mode where the poppet 22 and specifically the seal 24 seated therein is depressed, by overcoming the spring bias in spring 26, off of the shoulder 60. In effect, releasing lip 98 from shoulder 60 which creates an unrestricted fluid flow path into the inflatable device. As soon as the pump adapter or compressed gas pressure is removed, the spring 26 snaps the valve closed (back to its neutral position or mode).

If the volume or pressure of the compressed gas within the inflatable device exceeds the bias of spring 34, pressure relief occurs. Specifically, poppet 30 is axially forced outward as retainer 32 is forced into the valve body and spring 34 is compressed. Pressure relief occurs as the valve is in the pressure relief position and mode. As soon as the internal pressure within the inflatable device is at equilibrium with the spring bias of spring 34, the valve snaps closed (back to its neutral position or mode).

Figure 7A:
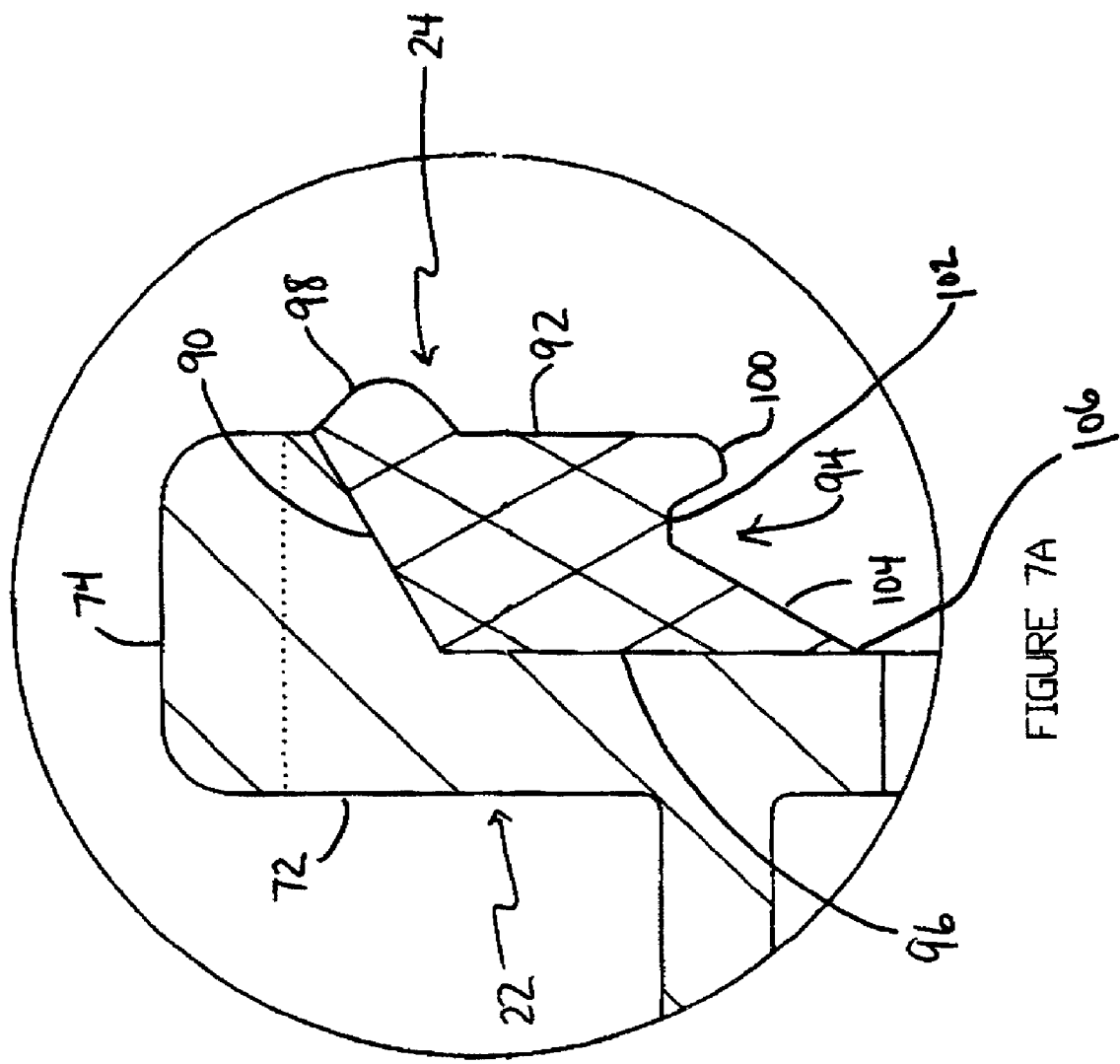
FIG. 7A is an enlarged view of a portion of FIG. 7.
Figure 9:
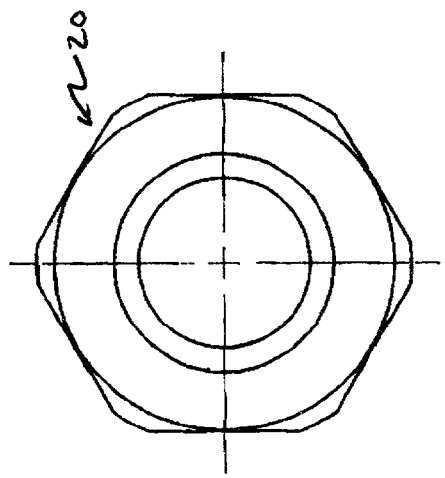
FIG. 9 is a top view of the valve body of FIG. 8.
Figure 22:
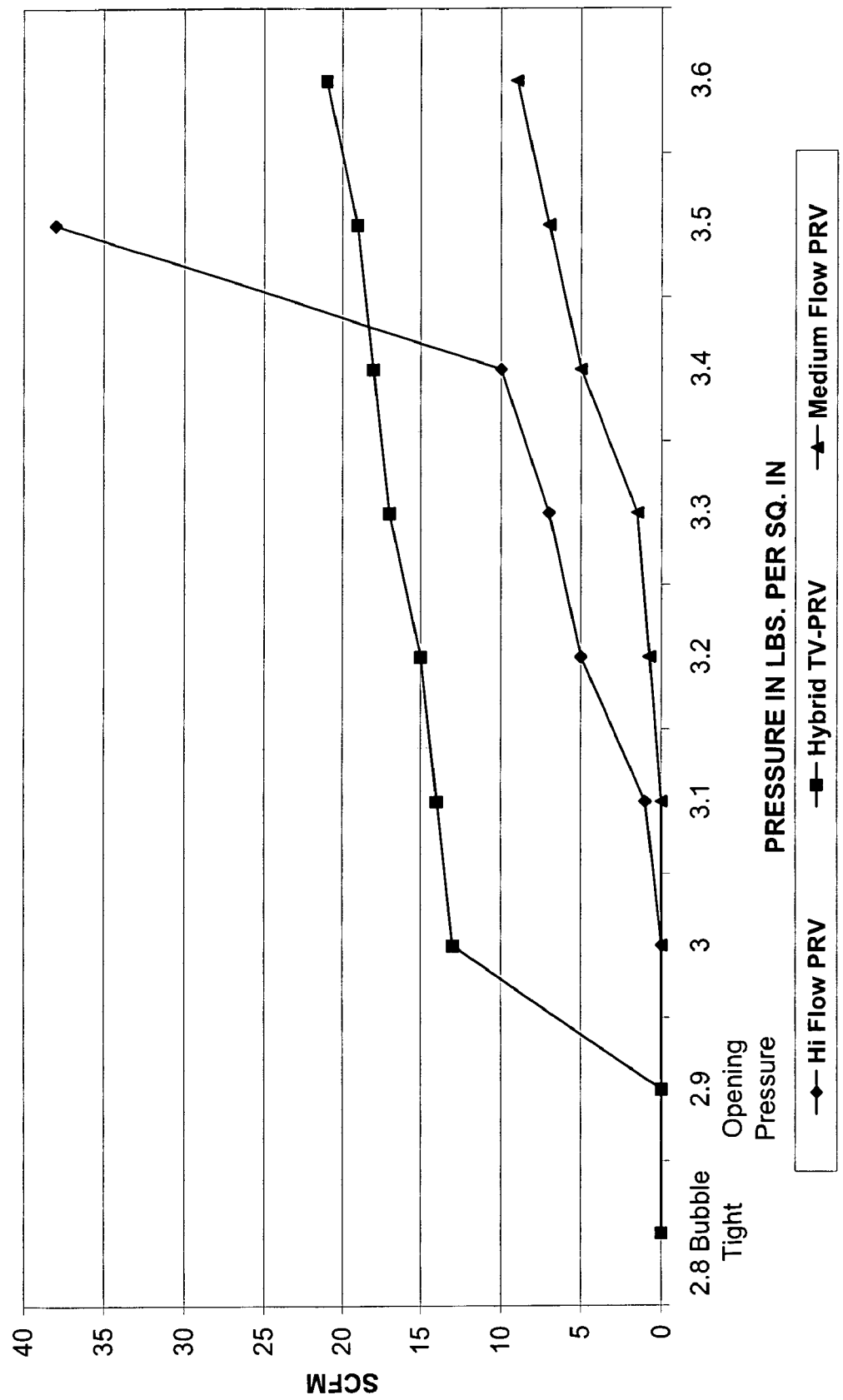
FIG. 22 is a graphical comparison of standard high and medium flow PRVs compared to the present invention (hybrid pressure relief and topping valve).

One of the unique features of this invention is the unique seal 24. It provides for dual sealing. It incorporates the topping valve and pressure relief valve sealing surfaces into one seal. This unique seal is best shown in FIG. 7A. This seal allows for the dual actions of topping and pressure relief all in one valve, and specifically one valve assembly while minimizing the needed space. The seal configuration also provides for significant fluid flow as is shown by the FIG. 22 which compares a standard medium and standard high flow PRV to the fluid flow provided by the unique seal and valve design of the present invention. As is shown, the design provides for bubble tight sealing up to 2.9 psi where rapid opening occurs resulting in almost 15 cfm by 3 psi in comparison to very slow opening by typical PRVs.

Another unique feature is the combination topping and pressure relief valve structure. The valve has two springs each uniquely biasing a sealing member in opposite directions.

Accordingly, the hybrid PRV and topping valve is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved pressure relief valve is constructed and used, the characteristics of the construction, and the advantageous, new and useful results obtained; the new and useful structures, devices, elements, arrangements, parts and combinations, are set forth in the appended claims.

We claim:

1. A pressure relief and topping valve for use in exhausting over-pressure in an inflatable device as well as topping off or inflating the inflatable device, the valve comprising:
    (a) a valve body having a fluid passage therein with an internal shoulder;
    (b) a first poppet having a recessed seat with a poppet aperture extending therein extending though the first poppet, the first poppet further including a plurality of outward stops extending front the poppet;
    (c) a first spring retainer for holding the first poppet within the fluid passage;
    (d) a first spring positioned between the first poppet and the first spring retainer for biasing the first poppet against the internal shoulder, the first spring being independent;
    (e) a seal having a seal aperture therein aligned with and having a greater internal diameter than the poppet aperture when the seal is seated within the recessed seat and selectively against the internal shoulder, the seal comprising an axially directed seating surface for sealable seating against the internal shoulder when the first poppet is biased against the internal shoulder, and a radially inwardly directed sealing shoulder for sealable seating against a second poppet when the second poppet is biased into the seal aperture by a second spring;
    (f) the second poppet having a stem extending to a head with a neck therebetween;
    (g) a second spring retainer for holding the second poppet within the fluid passage; and
    (h) the second spring being positioned between the first poppet and the second spring retainer for biasing the second poppet against the seal, the second spring operating independently from the first spring.

2. A bi-directional valve comprising:
    (a) a valve body comprising a radially inwardly directed shoulder and defining a fluid passage;
    (b) a first poppet biased toward the shoulder by a first spring and comprising a recessed seat circumferentially surrounding an aperture in which the recessed seat comprises a circumferential tapered wall terminating at a base surface surrounding the aperture;
    (c) a second poppet biased toward the aperture by a second spring; and
    (d) a seal seated into the recessed seat, comprising an axially directed first surface for sealing the first poppet against the shoulder, and a radially inwardly directed second surface for sealing the second poppet within the aperture.

3. A bi-directional valve comprising:
    (a) a valve body comprising a radially inwardly directed shoulder and defining a fluid passage;
    (b) a first poppet biased toward the shoulder by a first spring and comprising a recessed seat circumferentially surrounding an aperture;
    (c) a second poppet biased toward the aperture by a second spring; and
    (d) a seal seated into the recessed seat, comprising an axially directed first surface for sealing the first poppet against the shoulder, and a radially inwardly directed second surface for sealing the second poppet within the aperture, in which the seal further comprises a radially outwardly extending valley located axially between the second surface and the second poppet and radially inward from the first surface.

4. A bi-directional valve comprising:
    (a) a valve body comprising a radially inwardly directed shoulder and defining a fluid passage;
    (b) a first poppet biased toward the shoulder by a first spring and comprising a recessed seat circumferentially surrounding an aperture;
    (c) a second poppet biased toward the an aperture by a second spring; and
    (d) a seal seated within the recessed seat but not within the aperture, comprising an axially directed first surface for sealing the first poppet against the shoulder, and a radially inwardly directed second surface for sealing the second poppet;

in which the recessed seat comprises a circumferential tapered wall terminating at a base surface surrounding the aperture.

5. A bi-directional valve comprising:
    (a) a valve body comprising a radially inwardly directed shoulder and defining a fluid passage;
    (b) a first poppet biased toward the shoulder by a first spring and comprising a recessed seat circumferentially surrounding an aperture;
    (c) a second poppet biased toward the aperture by a second spring; and
    (d) a seal seated within the recessed seat but not within the aperture, comprising an axially directed first surface for sealing the first poppet against the shoulder, and a radially inwardly directed second surface for sealing the second poppet;

in which the seal further comprises a radially outwardly extending valley located axially between the second surface and the second poppet and radially inward from the first surface.

6. A bi-directional valve comprising:
(a) a valve body comprising a radially inwardly directed shoulder and defining a fluid passage;
(b) a first poppet biased toward the shoulder by a first spring and comprising a recessed seat circumferentially surrounding an aperture through the first poppet;
(c) a second poppet biased toward the aperture by a second spring; and
(d) a seal seated into the recessed seat, comprising an axially directed first surface for sealing the first poppet against the shoulder, and a radially inwardly directed second surface for sealing the second poppet outside the aperture.

7. A bi-directional valve comprising:
(a) a valve body comprising a radially inwardly directed shoulder and defining a fluid passage;
(b) a first poppet biased toward the shoulder by a first spring and comprising a recessed seat circumferentially surrounding an aperture having an inner diameter;
(c) a second poppet biased toward the aperture by a second spring; and
(d) a seal seated into the recessed seat, comprising an axially directed first surface for sealing the first poppet against the shoulder, and an annular radially inwardly directed second surface for sealing the second poppet radially outwardly beyond the inner diameter of the aperture.

* * * * *